(12) United States Patent
Pan

(10) Patent No.: US 11,986,882 B2
(45) Date of Patent: May 21, 2024

(54) SYSTEM AND METHOD OF 3D PRINTING

(71) Applicant: PANAM 3D LLC, Erwinna, PA (US)

(72) Inventor: Nick Pan, Erwinna, PA (US)

(73) Assignee: PANAM 3D LLC, Erwinna, PA (US)

( * ) Notice: Subject to any disclaimer, the term of this patent is extended or adjusted under 35 U.S.C. 154(b) by 0 days.

(21) Appl. No.: 18/139,398

(22) Filed: Apr. 26, 2023

(65) Prior Publication Data

US 2023/0256516 A1    Aug. 17, 2023

Related U.S. Application Data

(63) Continuation of application No. PCT/US2022/023647, filed on Apr. 6, 2022, which is a continuation of application No. 17/223,580, filed on Apr. 6, 2021, now abandoned.

(51) Int. Cl.
| | |
|---|---|
| *B22F 12/30* | (2021.01) |
| *B22F 10/28* | (2021.01) |
| *B22F 12/88* | (2021.01) |
| *B29C 64/153* | (2017.01) |
| *B29C 64/245* | (2017.01) |
| *B33Y 10/00* | (2015.01) |
| *B33Y 30/00* | (2015.01) |

(52) U.S. Cl.
CPC .............. *B22F 12/30* (2021.01); *B22F 10/28* (2021.01); *B22F 12/88* (2021.01); *B29C 64/153* (2017.08); *B29C 64/245* (2017.08); *B33Y 10/00* (2014.12); *B33Y 30/00* (2014.12)

(58) Field of Classification Search
CPC .......... B22F 12/30; B22F 12/88; B22F 10/28; B29C 64/153; B29C 64/245; B33Y 10/00; B33Y 30/00

USPC .......................................... 264/497; 425/375
See application file for complete search history.

(56) References Cited

U.S. PATENT DOCUMENTS

| | | | | |
|---|---|---|---|---|
| 10,730,237 | B2* | 8/2020 | Chanclon | B29C 64/40 |
| 2014/0170012 | A1* | 6/2014 | Delisle | B33Y 30/00 |
| | | | | 156/380.9 |
| 2018/0111319 | A1* | 4/2018 | Brezoczky | B29C 64/255 |
| 2019/0314894 | A1* | 10/2019 | Pan | B29C 64/241 |
| 2021/0260820 | A1* | 8/2021 | Selter | B33Y 30/00 |
| 2022/0134656 | A1* | 5/2022 | Galdeano Castillo | |
| | | | | B29C 64/153 |
| | | | | 264/308 |

* cited by examiner

*Primary Examiner* — Nahida Sultana
*Assistant Examiner* — Lawrence D. Hohenbrink, Jr.
(74) *Attorney, Agent, or Firm* — Massina Pat. & TM Law PLLC

(57) ABSTRACT

An apparatus and method for fabricating a three-dimensional object from a representation of the object stored in memory. The apparatus includes a build platform having a build gap defined therein. A base plate is initially supported along a lower surface of the build platform such that an edge of the base plate extends along and closes off the build gap. A powder delivery assembly is configured to supply powder to the build gap. At least one directed energy source is configured to apply directed energy to at least a portion of the build gap to form a layer of the three-dimensional structure. An advancement assembly configured to selectively engage with the base plate and/or the three-dimensional structure to hold the base plate and the three-dimensional structure in a fixed position during forming of a layer and to advance the base plate and the three-dimensional structure once the layer is formed.

21 Claims, 13 Drawing Sheets

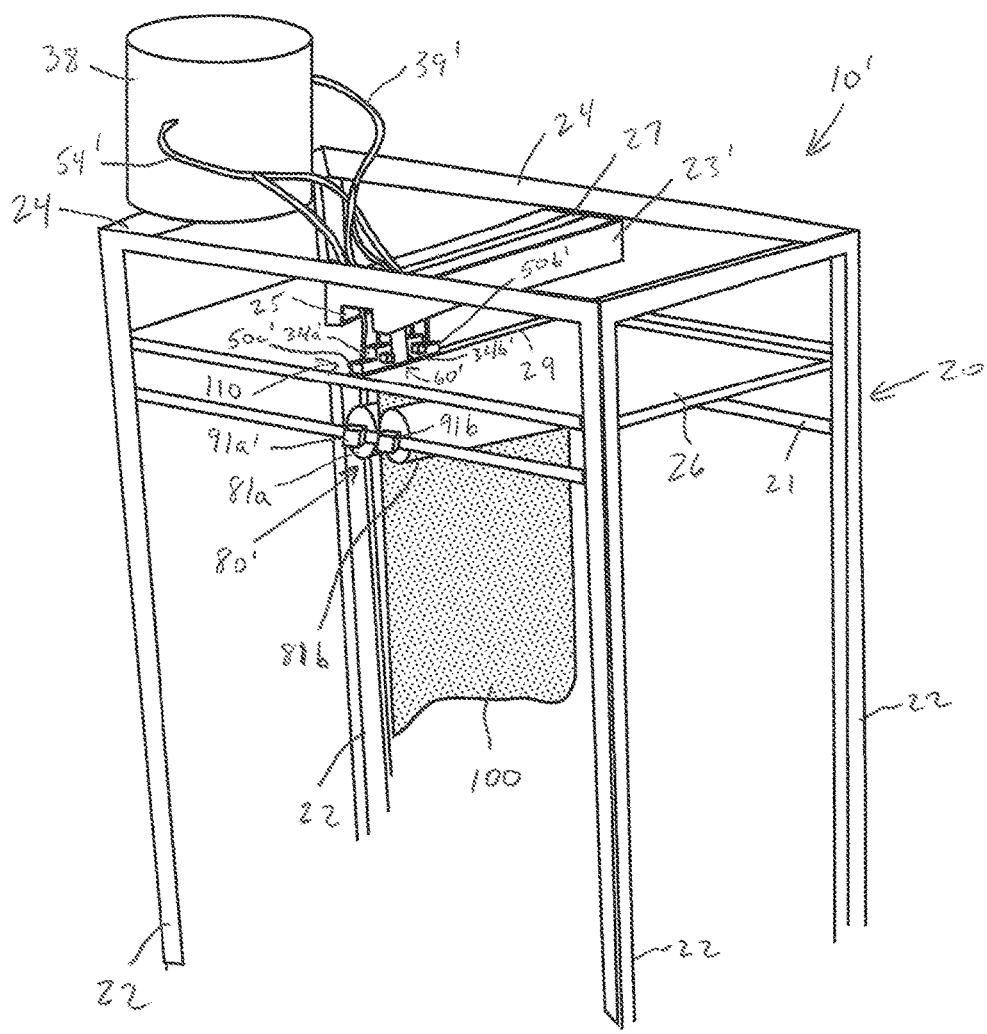
Fig. 10
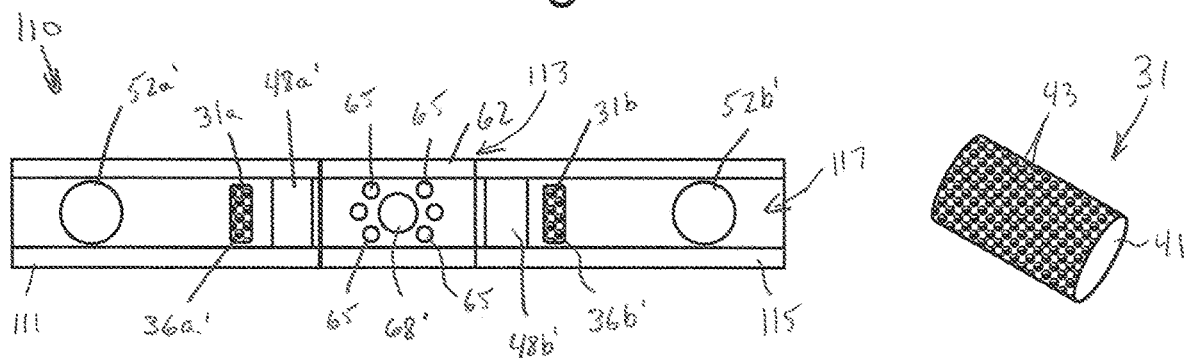
Fig. 13
Fig. 14

SYSTEM AND METHOD OF 3D PRINTING

This application is a continuation of PCT International Appln. No. PCT/US22/23647, filed Apr. 6, 2022, which claims priority to U.S. application Ser. No. 17/223,580, filed on Apr. 6, 2021, each of which is incorporated herein by reference.

FIELD

The disclosure herein relates to systems and methods for 3D printing, in particular for continuous 3D printing.

BACKGROUND

Three-dimensional (3D) printed parts result in a physical object being fabricated from a 3D digital image by laying down consecutive thin layers of material.

Typically, these 3D printed parts can be made by a variety of means, such as selective laser sintering, selective laser melting or selective electron beam melting, which operate by having a powder bed onto which an energy beam of light or heat is projected to melt the top layer of the powder bed so that it welds onto a substrate or a substratum. This melting process is repeated to add additional layers to the substratum to incrementally build up the part until completely fabricated.

For each additional layer, powder is deposited onto the powder bed and then must be smoothed prior to application of energy for the melting/sintering of the next layer. In this regard, the powder beds typically have a rectangular configuration and are of limited area and limited depth. Additionally, the entire powder bed must be filled. Such configurations limit printed structures to be of limited size and length.

SUMMARY

In at least one embodiment, the present disclosure provides an apparatus for fabricating a three-dimensional structure from a representation of the structure stored in memory. The apparatus includes a build platform having a build gap defined therein. A base plate is initially supported along a lower surface of the build platform such that an edge of the base plate extends along and closes off the build gap. A powder delivery assembly is configured to supply powder to the build gap. At least one directed energy source is positioned above the build platform and is configured to apply directed energy to at least a portion of the build gap to form a layer of the three-dimensional structure. An advancement assembly is positioned below the lower surface of the build platform. The advancement assembly is configured to selectively engage with the base plate and/or the three-dimensional structure to hold the base plate and the three-dimensional structure in a fixed position during forming of a layer and to advance the base plate and the three-dimensional structure once the layer is formed.

In at least one embodiment, the advancement assembly includes at least one advancement member which is moveable toward and away from the build platform and at least one hold member in fixed relation to the build platform. In at least one embodiment, the advancement member and the hold member are each a selectively energized magnet.

In at least one embodiment, the advancement assembly includes a pair of opposed rollers.

In at least one embodiment, the disclosure provides a method of fabricating a three-dimensional structure from a representation of the structure stored in memory, the method comprising: a) positioning a base plate along a lower surface of a build platform such that an edge of the base plate extends along and closes off a build gap defined in the build platform; b) retaining the base plate in position utilizing an advancement assembly; c) delivering powder to the build gap; d) moving at least one directed energy source relative to the build platform to apply directed energy to at least a portion of the build gap to form a layer of the three-dimensional structure; e) activating the advancement assembly such that the base plate and three-dimensional structure are moved downward a layer thickness relative to build platform; and f) repeating steps c-e until a complete three-dimensional structure is formed.

BRIEF DESCRIPTION OF THE DRAWINGS

The accompanying drawings, which are incorporated herein and constitute part of this specification, illustrate the presently preferred embodiments of the disclosure, and, together with the general description given above and the detailed description given below, serve to explain the features of the disclosure. In the drawings:

FIG. 10 is a perspective view of an alternative 3D printing system in accordance with an embodiment of the disclosure.

FIG. 13 is a bottom plan view of the printing block of FIG. 11.

FIG. 14 is a perspective view of an illustrative powder delivery roller.

DETAILED DESCRIPTION

Figure 1:
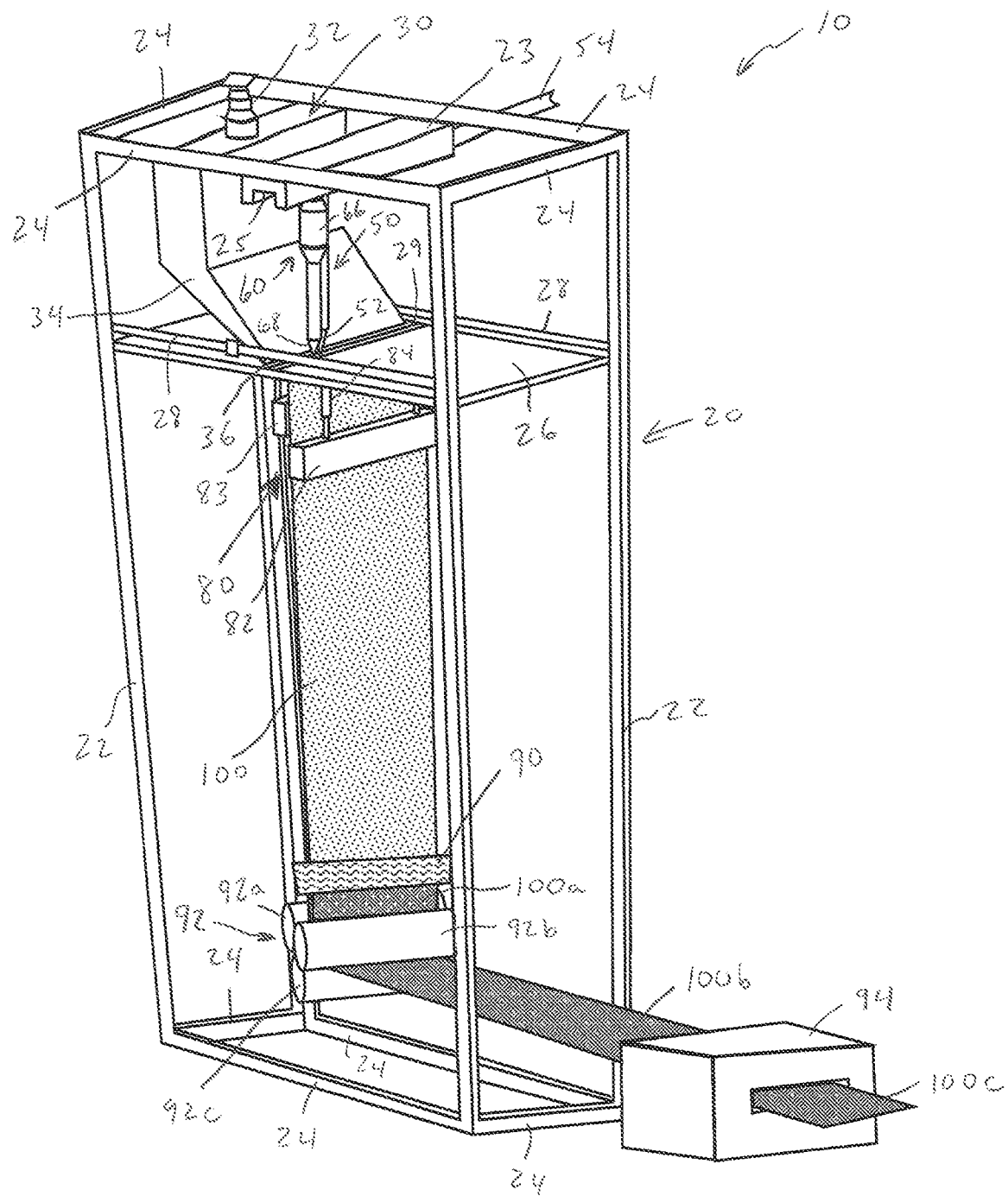
FIG. 1 is a top perspective view of a 3D printing system in accordance with an embodiment of the disclosure.

In the drawings, like numerals indicate like elements throughout. Certain terminology is used herein for convenience only and is not to be taken as a limitation on the present disclosure. The following describes preferred embodiments of the present disclosure. However, it should be understood, based on this disclosure, that the disclosure is not limited by the preferred embodiments described herein.

Referring to FIGS. 1-9, a 3D printing system 10 in accordance with an embodiment of the disclosure will be described generally. In the illustrated embodiment, the printing system 10 generally includes a support frame assembly 20, a powder delivery assembly 30, a targeted energy source assembly 60, a base plate 70 and an advancement assembly 80. The system 10 includes a gas supply assembly including gas supply tanks and an enclosure. Such a gas supply assembly is known in the art and is not shown or described in detail herein. FIG. 1 also shows an optional heater 90, roller assembly 92 and an oven 94.

Figure 4:
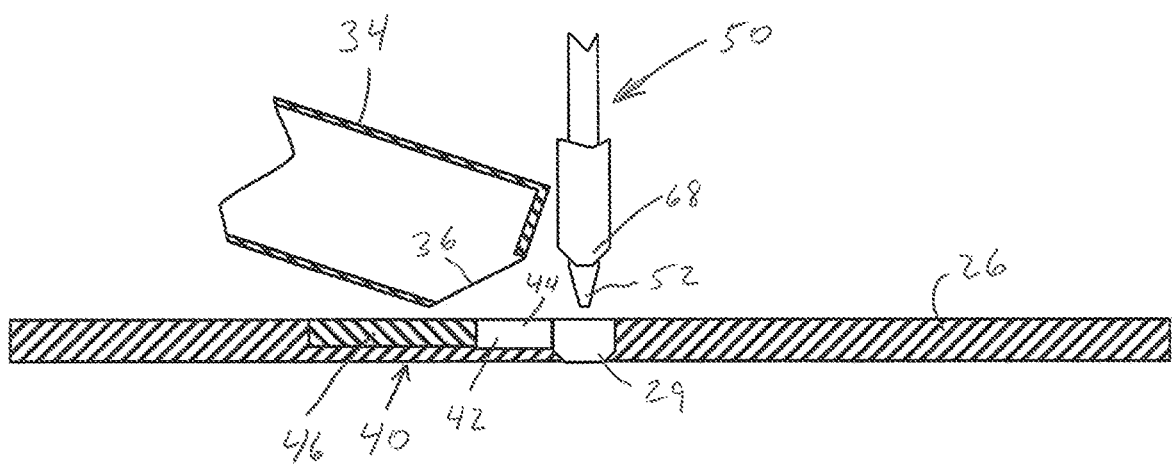
FIG. 4 is a cross-sectional view along the lines 4-4 of FIG. 3 with the advancement assembly omitted.

The illustrated support frame assembly 20 includes a plurality of vertical and horizontal support beams 22, 24 interconnected to form a support structure which supports a build platform 26. Additional support rails 28 may be provided. The configuration of the support beams 22, 24 and support rails 28 is not limited to the configuration shown and may have various configurations. The build platform 26 defines a build gap 29 extending laterally across the platform 26 for a substantial portion of the width of the platform 26. The build gap 29 is configured to receive powder 37 as described hereinafter. The platform 26 can have any desired width to define any desired build gap length. As a non-limiting example, the platform 26 could be 20 feet wide or more, allowing large sheets of formed structure 100 to be printed in successive layers. Referring to FIG. 4, the illustrated build gap 29 has a tapered configuration, however, such is not required. Additionally, the build gap 29 may have an adjustable configuration wherein the width of the build gap 29 is adjustable, for example, via a sliding plate (not shown) extending along one edge of the build gap 29. A support rail 23 is supported above the build platform 26 by the frame assembly 20. The support rail 23 defines a linear guide track 25 for movement of the energy source assembly 60 such that directed energy 69 is targeted to the build gap 29, as will be described hereinafter.

The powder delivery assembly 30 is supported above the build platform 26 and is configured to deliver powder to the build gap 29. In the illustrated embodiment, the powder delivery assembly includes a hopper 34 extending from an inlet 32 to an outlet 36. In the illustrated embodiment, the inlet 32 is connected via a hose 39 to a powder storage chamber 38. The outlet 36 extends adjacent the build gap 29 and preferably has a lateral width substantially equal to the lateral length of the build gap 29 such that the hopper 34 delivers powder 37 to the complete length of the build gap 29. The powder may be any form of small particles typically used in laser or electron beam 3D printing. For example, the powder may be of plastic, metal, ceramic, glass or composites thereof. As non-limiting examples, the powder may include polymers such as nylon (neat, glass-filled, or with other fillers) or polystyrene, or metals including steel, titanium, alloy mixtures, for example, but not limited to, 17-4 and 15-5 stainless steel, maraging steel, cobalt chromium, inconel 625 and 718, aluminum AlSi10Mg, and titanium Ti6Al4V. In the embodiment described below, the advancement assembly 80 includes magnets 82, 83 and therefore the powder 37 must be responsive to magnets, for example, by being a magnetic metal material or having some magnetic particles mixed therein. It is also possible to use non-magnetic materials by replacing the magnets 82, 83 with alternative holding means, for example, a vacuum force or rollers as described in conjunction with the embodiment of the disclosure illustrated in FIGS. 10-14.

Figure 5:
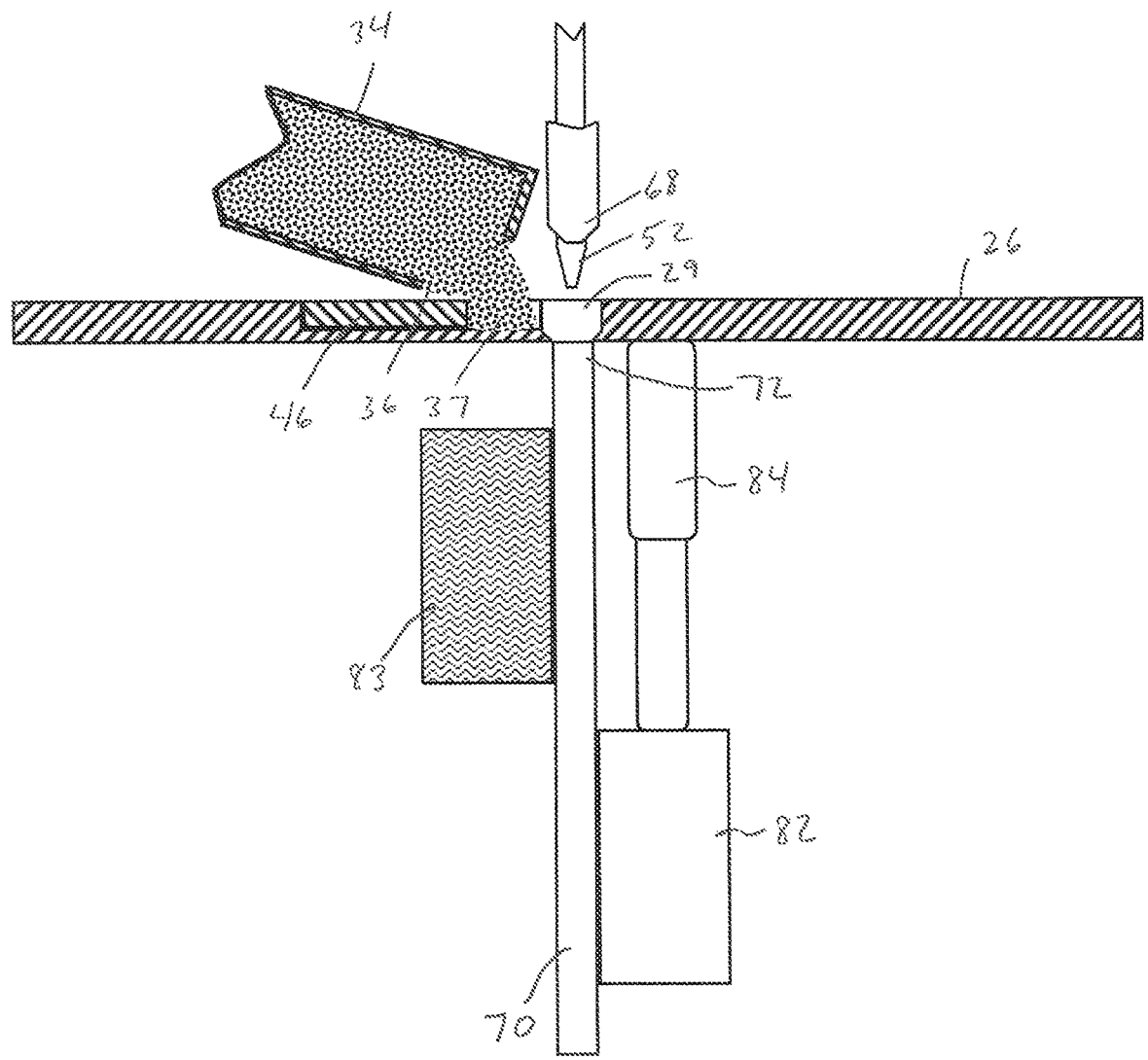
FIGS. 5-9 are cross-sectional views similar to FIG. 4 and illustrate an exemplary method of 3D printing utilizing the system of FIG. 1.
Figure 6:
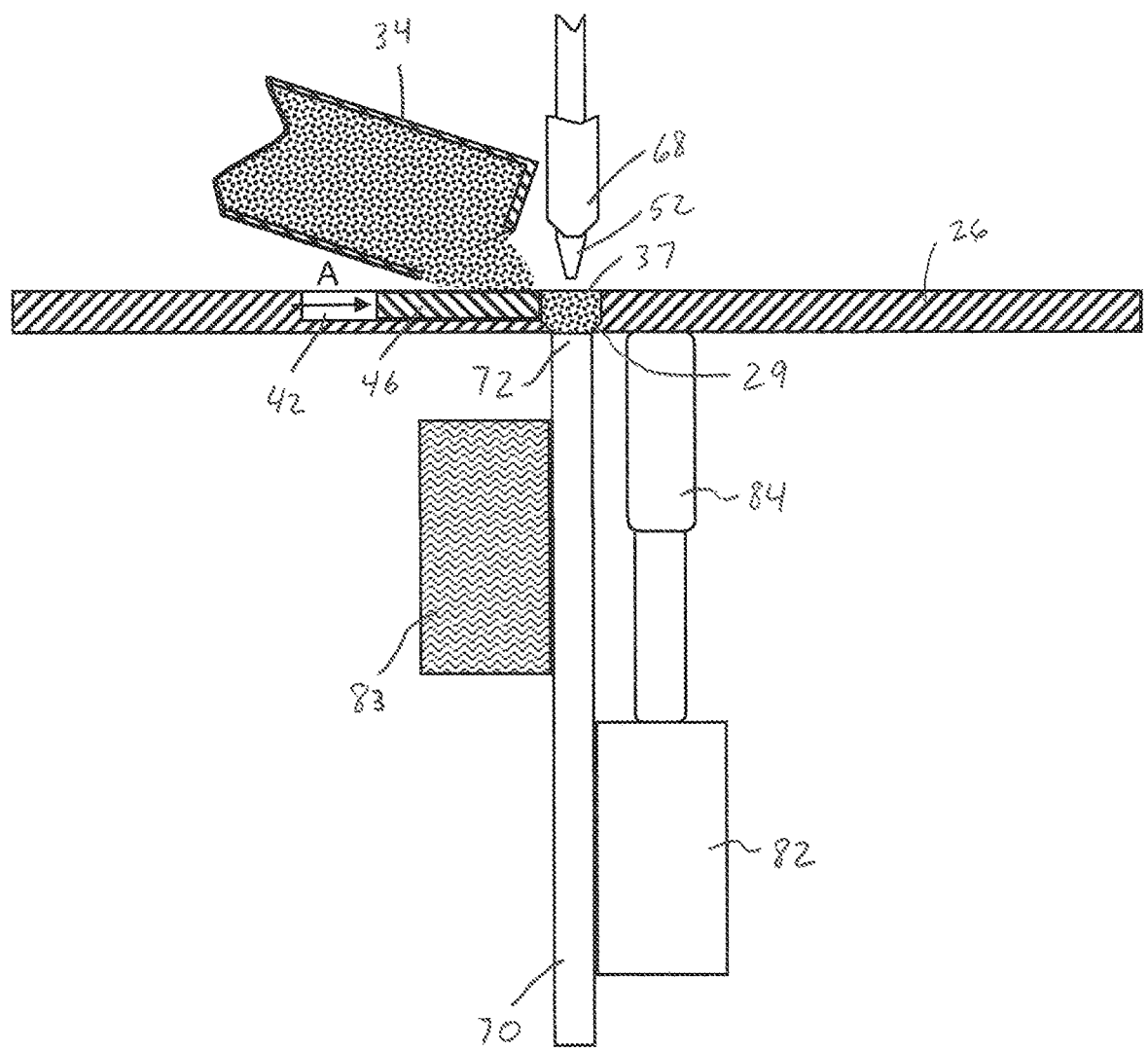
Figure 7:
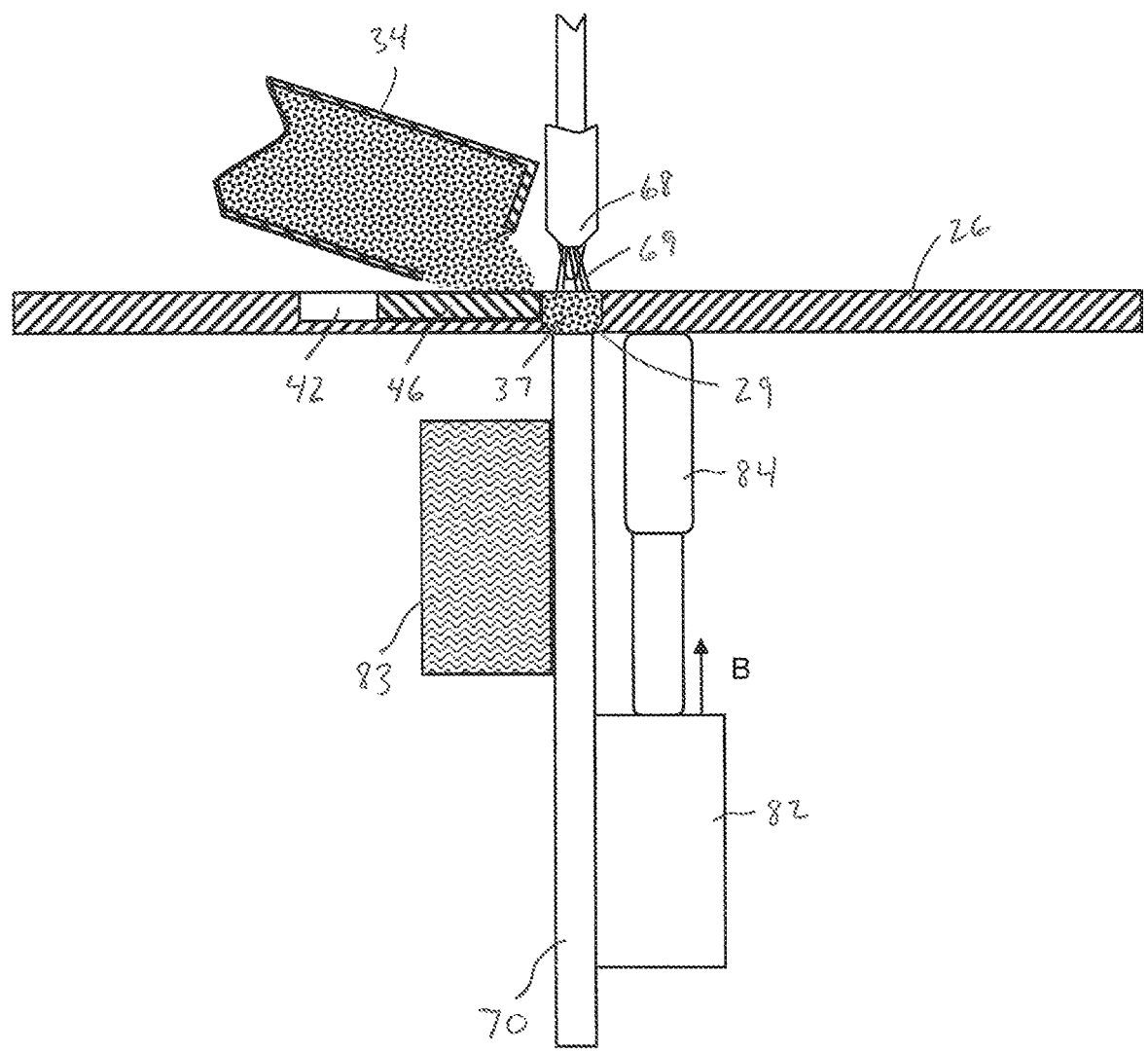
Figure 8:
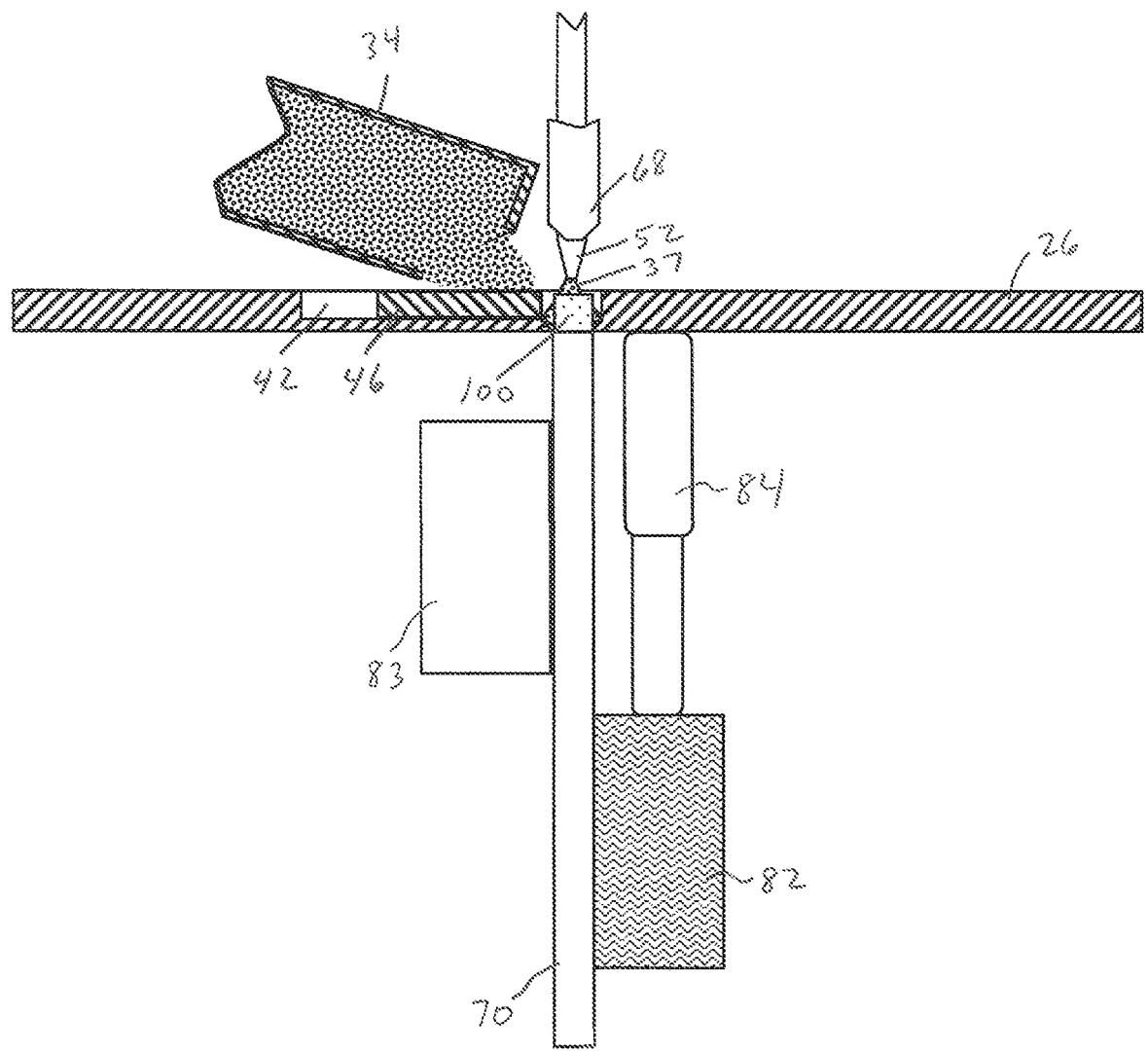
Figure 9:
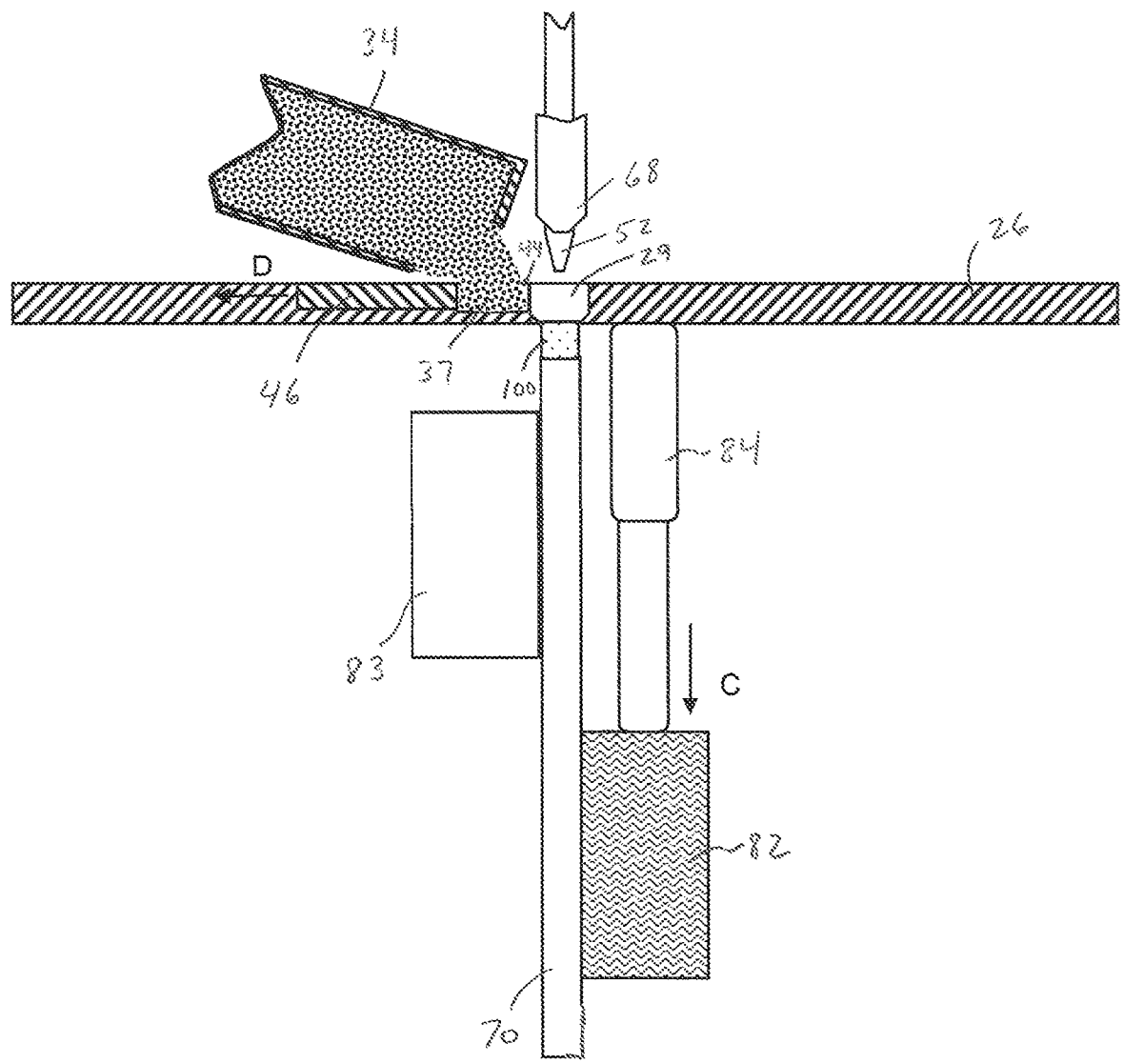

Referring to FIGS. 4-9, a distribution assembly 40 delivers the powder 37 from the outlet 36 to the build gap 29. In the illustrated embodiment, the distribution assembly 40 includes a pushing member 46 positioned in a groove 42 adjacent to the build gap 29. The pushing member 46 is moveable within the groove 42 from a retracted position as shown in FIGS. 4, 5 and 9 to an advanced position as shown in FIGS. 6-8. When the pushing member 46 is in the retracted position, a powder receiving area 44 is defined in the groove 42 between the pushing member 46 and the build gap 29. Powder 37 from the hopper 34 falls from the outlet 36 and fills the receiving area 44 as shown in FIG. 5. At the desired time, the pushing member 46 is moved toward the build gap 29, as indicated by arrow A in FIG. 6, to fill the build gap 29 with powder 37. The pushing member 46 may be maintained in the advanced position during the forming and vacuuming phases, as described below, to prevent additional powder from interfering with the build gap 29. After the powder 37 is delivered to the build gap 29, a smoothing element 48 is moved along the length of the build gap 29 to smooth the powder 37. The smoothing element 48 may be an elastomeric block, a brush or the like. While a pushing member 46 is described as an element of the distribution assembly 40, the disclosure is not limited to such and other distribution elements may be utilized, for example, a brush or a roller. Additionally, while the powder delivery assembly 30 includes a fixed hoper 34 along with a distribution assembly 40, it is also possible to utilize a moving powder delivery assembly, as will be described hereinafter, such that a distribution assembly 40 is not required.

Referring to FIG. 6, prior to initial start of the 3D printing process, a base plate 70 is secured relative to the build gap 29 such that an upper end 72 of the base plate 70 extends along and closes off the bottom of the build gap 29. As such, the upper end 72 of the base plate 70 supports the initial layer of powder 37. The base plate 70 has a height such that it interacts properly with the advancement assembly 80 as described hereinafter. After fusing of the first layer of powder 37, the formed structure 100 will remain connected to the base plate 70 and the combined structured will be moved down by the advancement assembly 80 (as described in more detail hereinafter) a distance equal to one layer thickness such that the build gap 29 may be refilled and the process repeated (see FIG. 9). Upon advancement, the formed structure 100 will close off the bottom of the build gap 29.

Figure 2:
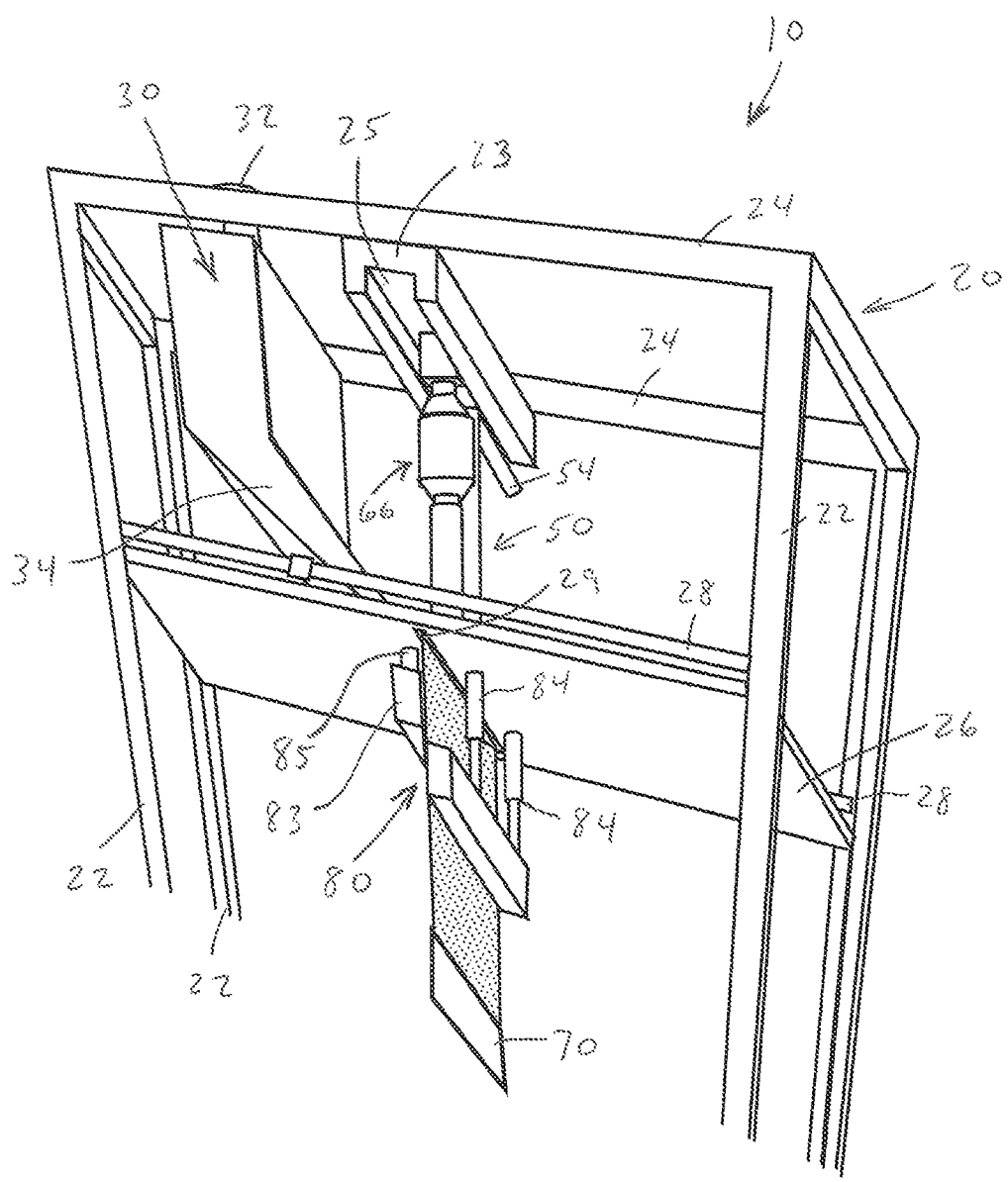
FIG. 2 is a bottom perspective view of the 3D printing system of FIG. 1.

Referring to FIGS. 1, 2 and 7, the targeted energy source assembly 60 includes an energy source 66. In the illustrated embodiment, the targeted energy source 66 is a laser. The laser 66 may have an associated beam deflection system (not shown), e.g. Galvano scanner, which is used to focus the laser beam 69 out the respective beam window 68 to the desired position on the build gap 29 in order to scan each layer. While a single laser is illustrated, multiple lasers may be utilized. The laser(s) may have various configurations, for example, Nd:YAG and Yb-fiber optic lasers, CO lasers and He—Cd lasers. While the illustrated embodiment utilizes lasers, other energy sources may be utilized, for example, electron beam guns.

Figure 3:
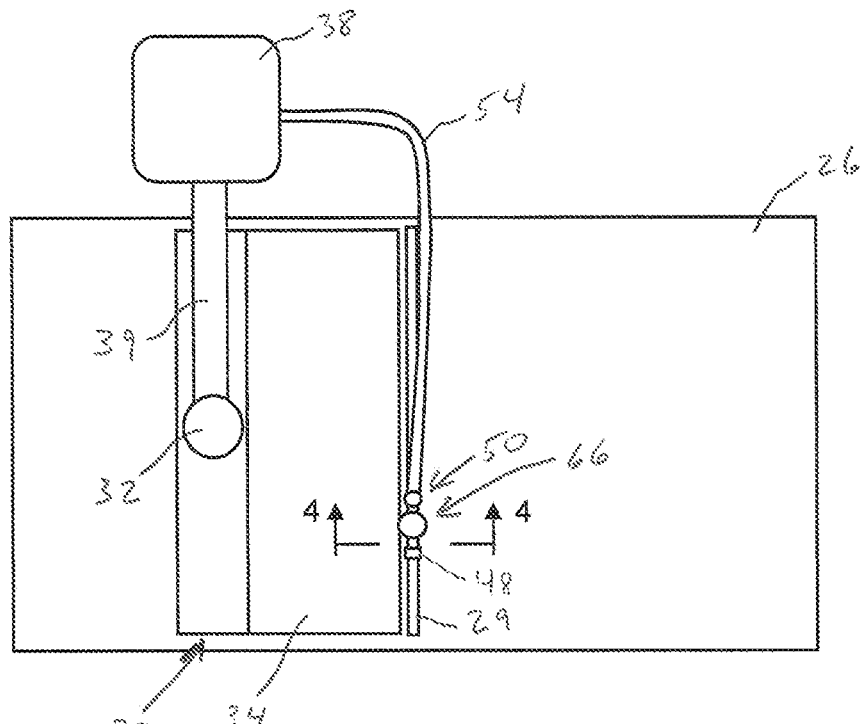
FIG. 3 is a top plan view of the 3D printing system of FIG. 1.

Referring to FIGS. 3 and 8, after the laser 66 has completed fusing a layer of the formed structure 100, some powder 37 may remain in the build gap 29. A vacuum assembly 50 is configured to move along the build gap 29 such that a nozzle 52 vacuums any unfused powder 37 out of the build gap 29. In the illustrated embodiment, a tube 54 connects the vacuum assembly 50 to the powder storage chamber 38 such that excess powder may be recirculated. A filter (not shown) may be provided along the tube 54. The tube 54 preferably has a flexible configuration to allow it to move with the vacuum assembly 50.

Referring to FIGS. 2 and 6-9, an illustrative advancement assembly 80 will be described. The advancement assembly 80 is configured to be secured relative to the base plate 70 and/or formed structure 100 and to incrementally advance such during printing. In the illustrated embodiment, the advancement assembly 80 includes a moveable advancement magnet 82 and a fixed hold magnet 83. As illustrated, the magnets 82, 83 are positioned on opposite sides of the build gap 29, however, it is possible for the magnets 82, 83 to be on the same side of the gap 29. The magnets 82, 83 extend the substantial width of the build platform 26. While the magnets 82, 83 are shown as continuous structures, it is possible that one or both magnets may be provided as spaced apart segments. The hold magnet 83 is supported relative to the underside of the build platform 26 by one or more posts 85. The advancement magnet 82 is secured to the underside of the build platform 26 by one or more linear actuators 84. The linear actuators 84 may have various configurations, for example, stepper motors, servomotors, screw drives, pneumatic cylinders, hydraulic cylinders, or any other desired configuration. The linear actuators 84 are configured to move the magnet 82 toward and away from the build platform 26. The advancement magnet 82 and the hold magnet 83 are energized in sequence to facilitate holding the base plate/formed structure during forming and then advancing the combined structure after each layer of forming is completed, as will be described in detail hereinafter. While magnets are described herein and are configured to hold magnetic base plates 70 and formed structures 100, other configurations, for example, vacuum plates, may be utilized for magnetic and non-magnetic structures.

Having generally described the components of the printing system 10, operation thereof will be described with reference to FIGS. 6-9. At the start of the process as illustrated in FIG. 5, the base plate 70 is positioned below the build platform 26 such that the upper end 72 thereof extends along and closes off the build gap 29. The hold magnet 83 is energized such that it holds the base plate 70 in this initial position. Turning to FIG. 6, with the base plate 70 so retained, the pushing member 46 is moved to the advanced position as indicated by arrow A such that powder 37 is distributed into the build gap 29. Once the gap 29 is filled to a desired level, the smoothing element 48 is moved along the length of the build gap 29 to smooth the powder 37.

Turning to FIG. 7, once the powder 37 is smooth, the laser 66 is activated and moved along the length of the build gap 29 such that the laser beam 69 selectively acts on the powder 37. While the gap 29 is being filled and/or while the laser 66 is activated, the linear actuator 84 is utilized to move the advancement magnet 82 (which is not energized) toward the build platform 26 as indicated by arrow B. Once the advancement magnet 82 is in the desired retracted position, the advancement magnet 82 is energized such that it is secured to the base plate/formed structure, as shown in FIG. 8. At this time, the hold magnet is de-energized. Once the laser 66 is complete, the vacuum assembly 50 may be utilized to remove any unformed powder 37 from the build gap 29.

Turning to FIG. 9, once the gap 29 has been cleared, the linear actuator 84 is utilized to move the advancement magnet 82 away from the build platform 26, as indicated by arrow C, a distance equal to one build layer. Since advancement magnet 82 is secured to the base plate/formed structure and the hold magnet is not secured thereto, the base plate and formed structure is advanced the equivalent of one build layer, with the formed structure extending slightly into and closing off the build gap. At or around the same time, the pushing member 46 is moved back to the retracted position such that powder 37 flows into the receiving area 44. The process is then repeated starting with FIG. 6. The repeating process will continually print the formed structure which may be of any desired length, for example, by rolling the formed structure as it is continually printed and advanced from the build platform 26.

Referring again to FIG. 1, the system 10 may include optional post forming elements. In the illustrated embodiment, the optional elements include a heater 90, a roller assembly 92 and an oven 94. The roller assembly 92 may be utilized simply for directing of the formed structure 100. In the illustrated embodiment, the roller assembly 92 includes three rollers 92a-92c which are positioned and configured to compress and thereby smooth the formed structure 100. The heater 90 is positioned prior to the roller assembly 92 such that a heated area of the formed structure 100a is delivered to the roller assembly 92. The roller assembly 92 compresses the heated area of the formed structure 100a such that a smooth formed structure 100b is delivered from the roller assembly 92. The heater 90 may have various configurations, for example, an electronic heating bar, infrared heating bar, induction heating bar or the like. The oven 94 receives the formed structure 100b and may be utilized for further treatment, for example, for annealing, normalizing, hardening and the like. The finished structure 100c exits the oven 94 and moves downstream.

Figure 11:
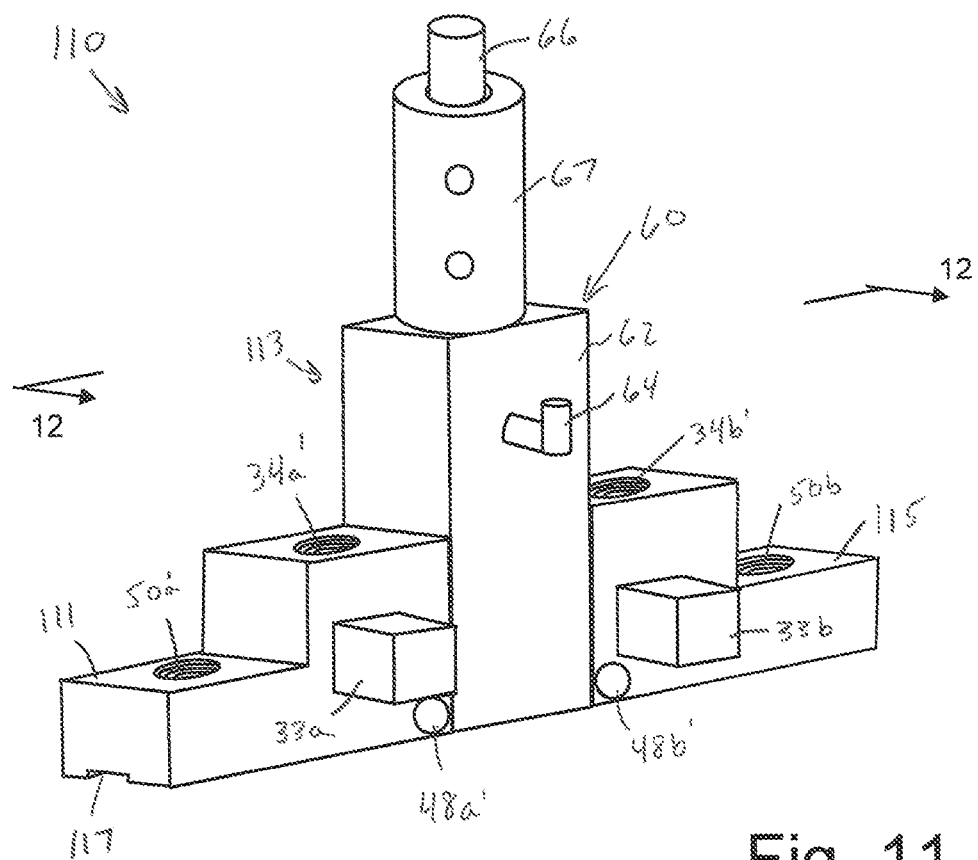
FIG. 11 is a perspective view of a printing block in accordance with an embodiment of the disclosure.
Figure 12:
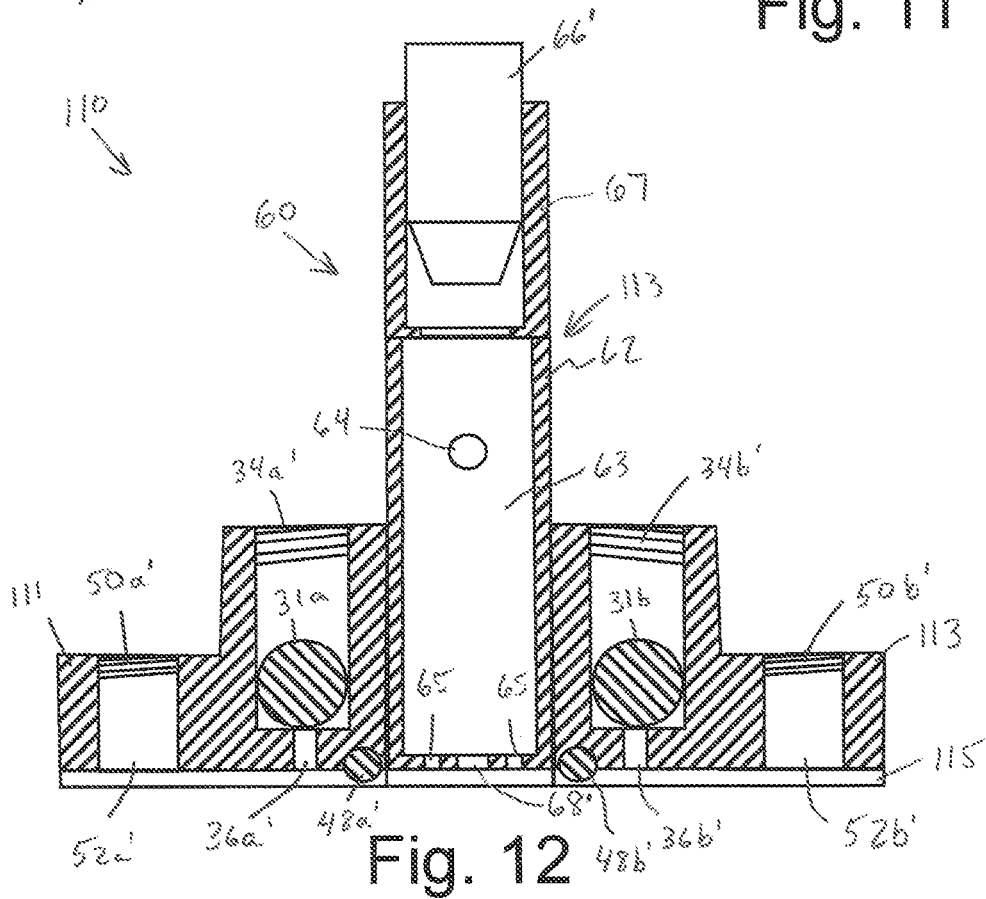
FIG. 12 is a cross-sectional view along the line 12-12 in FIG. 11.

Turning to FIGS. 10-16, a 3D printing system 10' in accordance with another embodiment of the disclosure is shown. The printing system 10' is similar to the previous embodiment and only the differences will be described. In the present embodiment, the delivery assembly 30' includes a pair of delivery ports 34a' and 34b' configured to be moved laterally across the build platform 26 to fill the build gap 29. With reference to FIGS. 12-14, each delivery port 34a', 34b' includes a distribution roller 31a, 31b. The distribution roller 31 has a cylindrical body 41 rotatably supported and connected to a respective motor 33a, 33b. The cylindrical body 41 has a plurality of small cavities 43 defined in the surface thereof. As the distribution roller 31 is rotated, powder is received into the cavities 43. As the roller 31 rotates, the cavities 43 carry the powder toward and deliver to the respective outlets 36a', 36b'. Since the powder is carried by the cavities 43, the rate of rotation of the distribution roller 34 will control the amount of powder delivered toward the build gap 29, i.e. the faster the distribution roller 31 is rotated, the more powder will be delivered. Furthermore, stopping either roller 31a, 31b stops distribution from the respective delivery port 34a', 34b'.

Referring to FIGS. 11 and 12, the delivery ports 34a' and 34b' are integrated into a printing block 110. The printing block 110 includes the delivery ports 34a' and 34b', a pair of vacuum ports 50a' and 50b' and the targeted energy source assembly 60'. In the illustrated embodiment, delivery port 34a' and vacuum port 50a' are provided in a first block member 111, the energy source assembly 60' includes a second block member 113, and delivery port 34b' and vacuum port 50b' are provided in a third block member 115 and the blocks 111-115 are interconnected to one another. Such an assembly allows for flexibility in the individual elements, however, it is understood that the block 110 may be a unitary structure or have more or fewer block members.

A continuous channel 117 extends across the bottom of the printing block 110 across each of the block members 111-115.

The printing block 110, by including a pair of delivery ports 34a' and 34b' and a pair of vacuum ports 50a' and 50b', may move back and forth within the guide track 25 and print while moving in each direction. As an example, when the print block 110 is moving from right to left with reference to FIG. 12, the delivery port 34a' is configured to dispense powder from outlet 36a'. The dispensed powder will be smoothed by roller 48a' before being acted upon by the laser through window 68'. The nozzle 52b' of vacuum port 50b' will vacuum any unfused powder 37 out of the build gap 29. When the printing block 110 moves in the opposite direction, from left to right with reference to FIG. 12, the delivery tube 34b' is configured to dispense powder from outlet 36b'. The dispensed powder will be smoothed by roller 48b' before being acted upon by the laser through window 68'. The nozzle 52a' of vacuum port 50a' will vacuum any unfused powder 37 out of the build gap 29. As seen in FIG. 10, the delivery hose 39' may divide and go to both delivery ports 34a' and 34b' and the vacuum tube 54' may divide and attach to both vacuum ports 50a' and 50b'. A slot 27 in the guide support 23' allows the hoses 39' and tubes 54' to connect with each respective block member 111, 115. While the printing block 110 is illustrated to function in both directions, such may not be necessary in some applications and the printing block would include only a single delivery tube and a single vacuum port.

Figure 15:
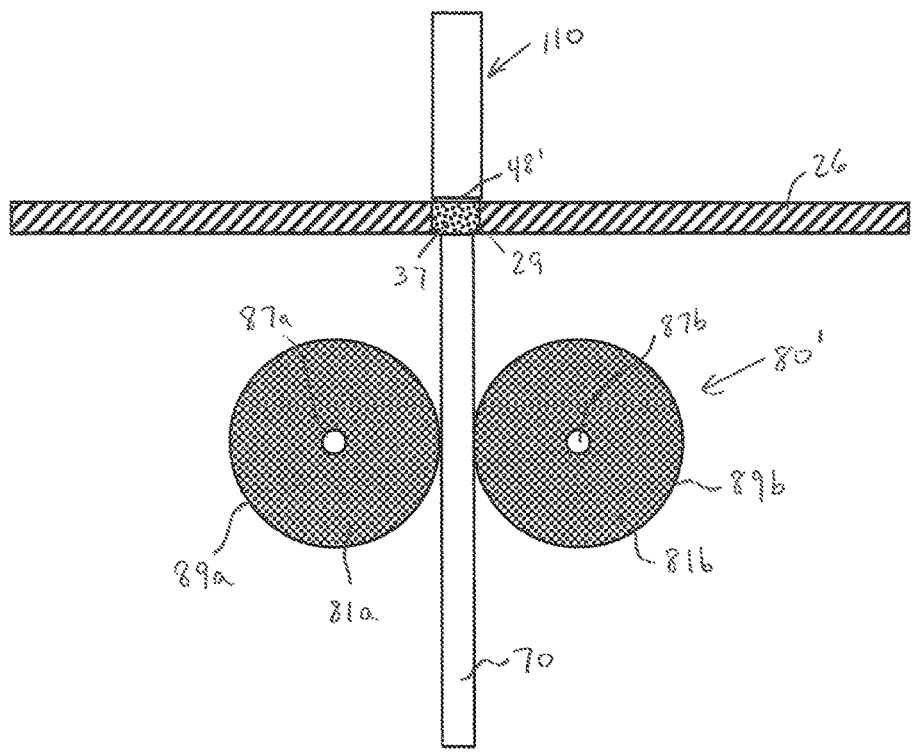
FIGS. 15 and 16 are cross-sectional views of the printing system of FIG. 10.
Figure 16:
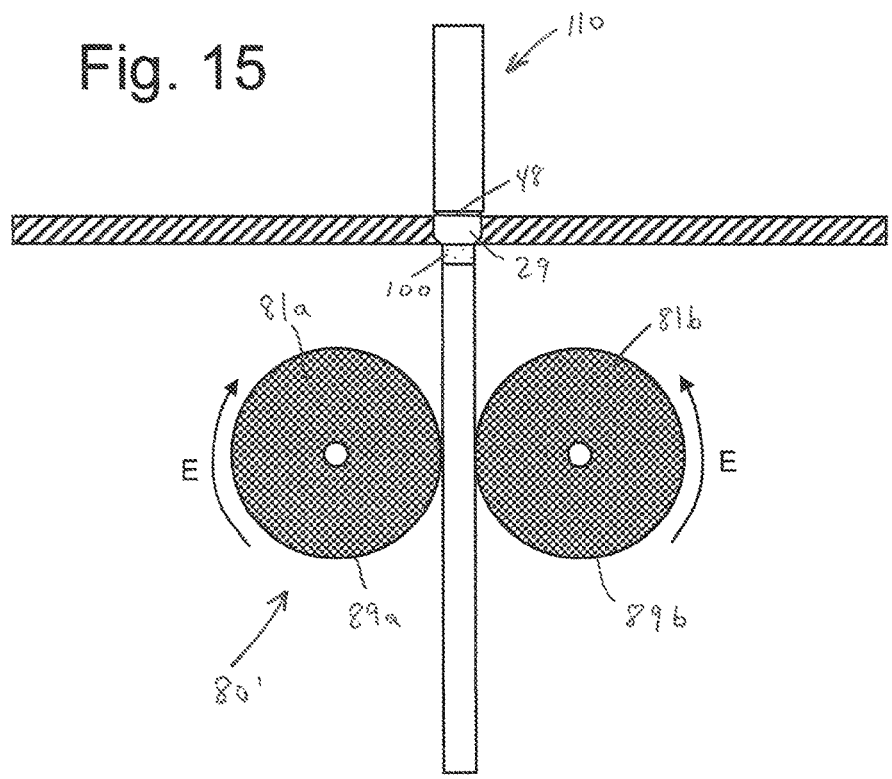
Figure 17:
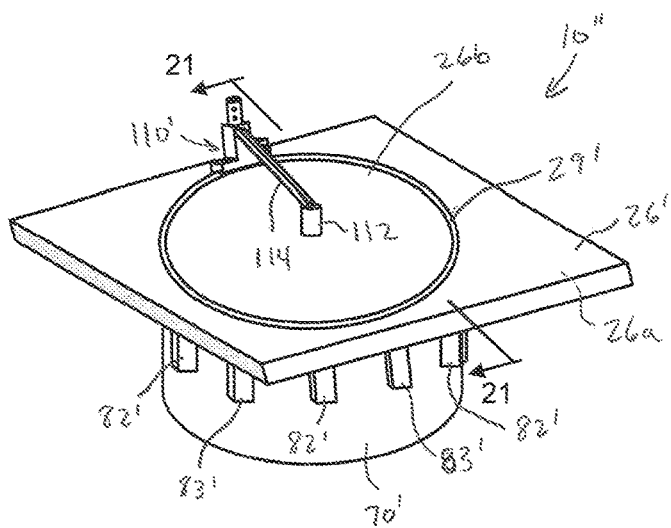
FIG. 17 is a top perspective view of another alternative 3D printing system in accordance with an embodiment of the disclosure.

Referring to FIGS. 10, 15 and 16, the advancement assembly 80' of the present embodiment will be described. In the present embodiment, the advancement assembly 80' includes a pair of opposed rollers 81a, 81b which are supported on axles 87a, 87b extending between supports 21. Each of the rollers 81a, 81b has a friction surface 89a, 89b such that the rollers 81a, 81b contact and control the position of the base plate 70 or formed structure 100. The rollers 81a, 81b may be formed, for example, from a rubberized material to define such friction surfaces 89a, 89b.

In the illustrated embodiment, each of the rollers 81a, 81b has an associated servomotor 91a, 91b configured to selectively rotate the respective roller 81a, 81b in a controlled manner. While a servomotor is described, any desired rotary actuator may be utilized. During printing of a layer, the motors 91a, 91b are inactive and the base plate 70 and/or formed structure 100 are held in a fixed position. Once the layer is completed, the motors 91a, 91b are actuated to rotate each roller 81a, 81b as indicated by arrows E in FIG. 14. The angle of rotation is minimal, just enough to advance the base plate 70/formed structure 100 a distance equal to the thickness of a single layer. In other aspects, the printing system 10' operates in a manner similar to the previous embodiment.

Turning to FIGS. 17-21, a 3D printing system 10" in accordance with another embodiment of the disclosure will be described. The system 10" is substantially the same as the previous embodiments and only the differences will be described herein. The system 10" will include a frame structure similar to the previous embodiment, however, only the build platform 26' thereof is illustrated. The build platform 26' defines a circular build gap 29' such that a continuous circular structure may be printed. While a circular gap 29' is shown and described, the gap may have other configurations, for example, polygonal or elliptical. Because of the continuous gap 29', the build platform 26' includes an outer member 26a and an inner member 26b, which are both independently supported relative to the frame structure.

The base plate 70' has a circular tubular configuration which complements the build gap 29'. Advancement magnets 82' and hold magnets 83' are provided along the outside of the base plate 70', however, it is possible that the magnets 82', 83' could be provided on opposite sides. The magnets 82', 83' are provided as a plurality of spaced magnets, but may be provided as continuous structures. As in the previous embodiment, the advancement magnets 82' are supported by linear actuators 84 and the hold magnets 83 are supported by fixed posts 85. The magnets 82', 83' function in the same manner as described above. Additionally, the magnets may be replaced by other hold configurations, for example, vacuum plates. Similar to the previous embodiments, the system 10" may be utilized to print a tubular formed structure of any desired length.

Figures 18, 19, 20:
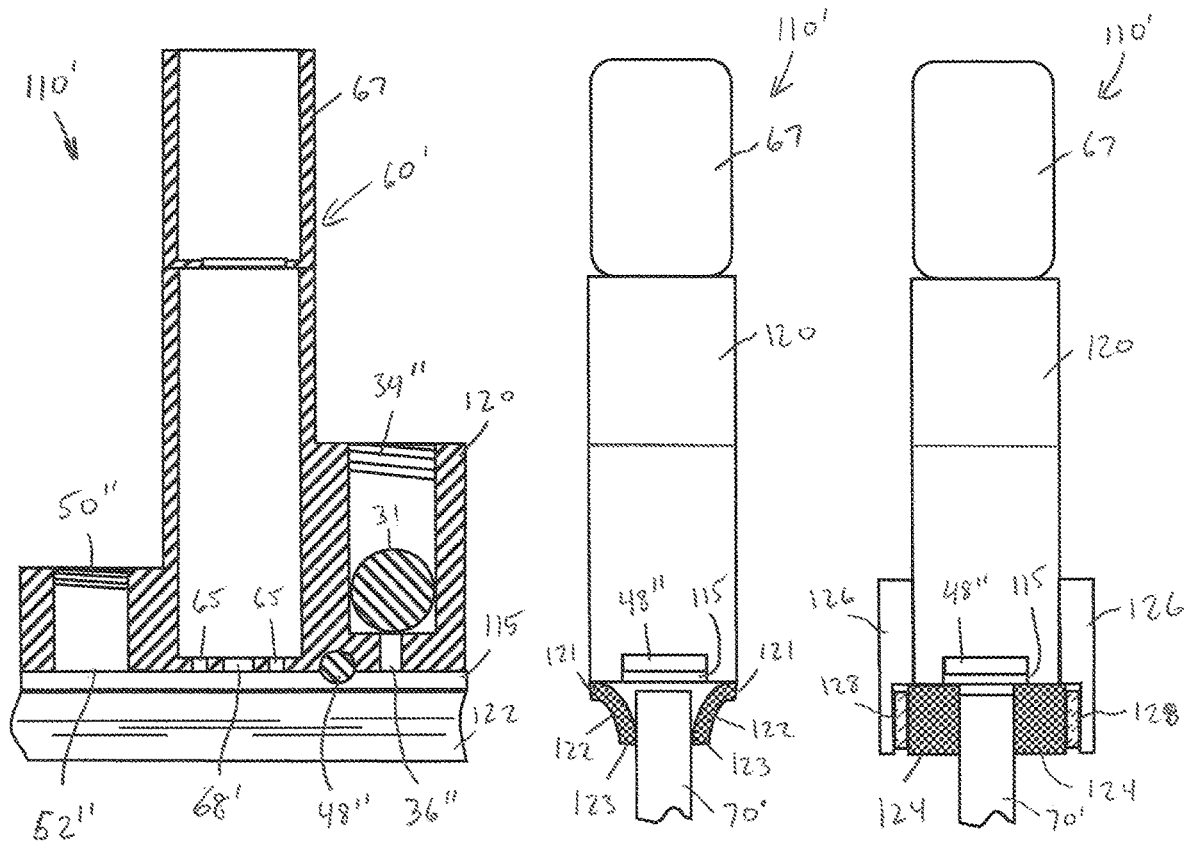
FIG. 18 is a cross-sectional view of the printing block of the embodiment of FIG. 17.
FIG. 19 is an end elevation view of the printing block of FIG. 18.
FIG. 20 is an end elevation view of an alternative printing block.
Figure 21:
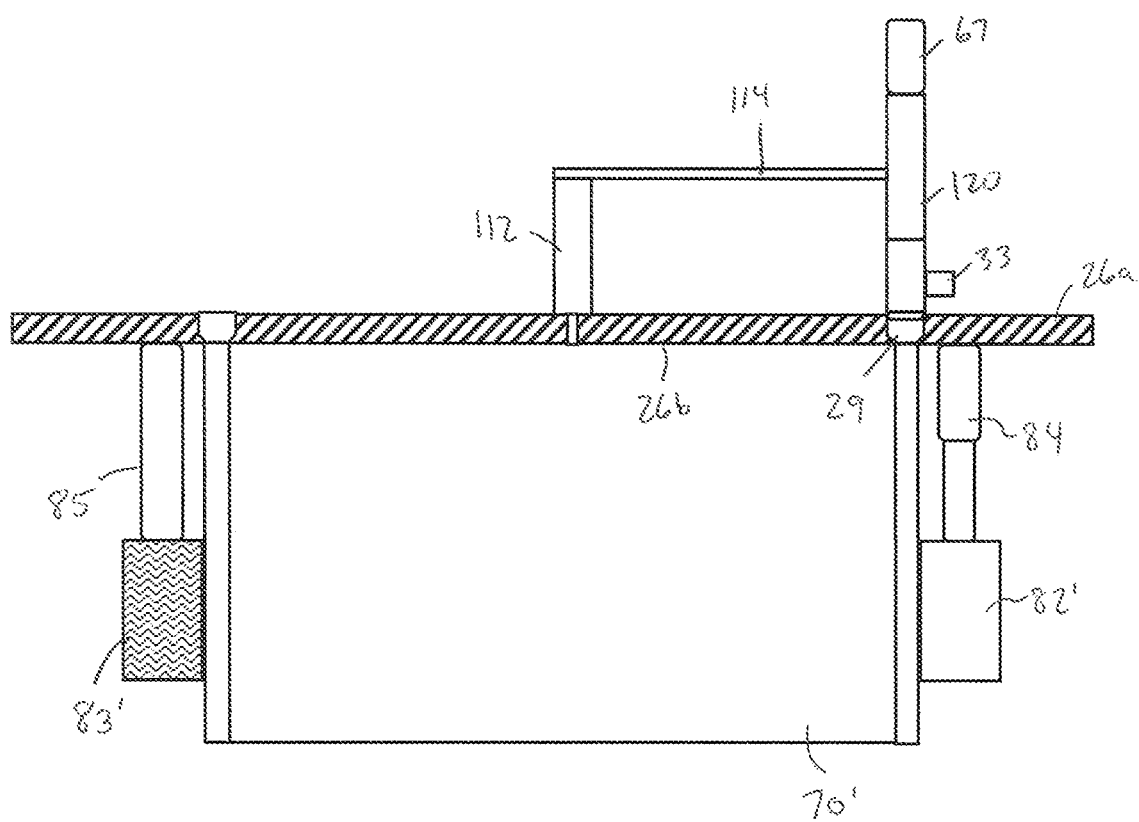
FIG. 21 is cross-sectional view along the lines 21-21 in FIG. 17.

In the present embodiment, a printing block 110' is configured to move in a circular motion which complements the build gap 29'. In the present embodiment, a guide arm 114 extends from a central rotation post 112 to the printing block 110'. Since the printing block 110' is configured to travel in a single direction, only one delivery tube and one vacuum port are necessary, however, it is understood that the printing block could be configured to travel in both directions. As shown in FIG. 18, the printing block 110' includes delivery port 34" with a corresponding outlet 36", smoothing roller 48", targeted energy source assembly 60', and vacuum port 50" with a nozzle 52". The elements are all defined in a single block member 120, although multiple block members may be utilized.

Referring to FIGS. 18 and 19, the printing block 110' includes opposed powder containment flaps 122. Each flap 122 extends the length of the block member 120 along a respective side edge. In the illustrated embodiment, each flap 122 has a convex configuration extending from an attached end 121 to a free end 123. The convex configuration causes the free ends 123 to be naturally biased toward one another such that the flaps 122 contact and seal against the base plate 70 or formed structure 100. With the vacuum nozzle 52" immediately following the laser window 68', any unfused powder supported by the flaps 122 will be immediately vacuumed away. The flaps 122 are preferably manufactured from a durable material, for example, semi-metallic brake pad material, such that they withstand the friction caused by movement of the printing block 110'.

Referring to FIG. 20, an alternative powder containment assembly is illustrated. In this embodiment, a pair of opposed containment pads 124 are supported by supports 126 extending from the block member 120 of the printing block 110". A spring member 128 or the like is positioned between each pad 124 and the respective support 126 such that the pads 124 are biased into engagement with the base plate 70 or formed structure 100. The bias is preferably sufficient to provide a desired seal yet allow the formed structure 100 to be moved down after the layer is completed. As an alternative, the spring members 128 or supports 126 may be configured to slightly disengage the containment pads 124 during the downward movement. While the containment flaps 122 and containment pads 124 are described with respect to the current embodiment, it is understood that similar structures may be utilized in the previous embodiments.

These and other advantages of the present disclosure will be apparent to those skilled in the art from the foregoing specification. Accordingly, it will be recognized by those skilled in the art that changes or modifications may be made to the above-described embodiments without departing from the broad inventive concepts of the disclosure. It should therefore be understood that this disclosure is not limited to the particular embodiments described herein, but is intended to include all changes and modifications that are within the scope and spirit of the disclosure as defined in the claims.

What is claimed is:

1. An apparatus for fabricating a three-dimensional structure from a representation of the structure stored in memory, the apparatus comprising:
 a build platform having an upper surface and a lower surface with a build gap defined through the build platform from the upper surface to the lower surface;
 a base plate initially supported along the lower surface of the build platform such that an edge of the base plate extends along and closes off the build gap;
 a powder delivery assembly configured to supply powder to the build gap;
 at least one directed energy source positioned above the build platform, the at least one directed energy source configured to apply directed energy to at least a portion of the build gap to form a layer of the three-dimensional structure; and
an advancement assembly positioned below the lower surface of the build platform, the advancement assembly is configured to selectively engage with the base plate and/or the three-dimensional structure to hold the base plate and the three-dimensional structure in a fixed position during forming of the layer and to advance the base plate and the three-dimensional structure further below the lower surface of the build platform once the layer is formed, wherein after advancement over a first given distance, the advancement assembly directly engages the three-dimensional structure.

2. The apparatus according to claim 1 wherein the advancement assembly includes at least one advancement member which is moveable toward and away from the build platform and at least one hold member in fixed relation to the build platform.

3. The apparatus according to claim 2 wherein the advancement member and the hold member are each a selectively energized magnet.

4. The apparatus according to claim 1 wherein the advancement assembly includes a pair of opposed rollers.

5. The apparatus according to claim 4 wherein each of the opposed rollers has a friction surface.

6. The apparatus according to claim 1 wherein the build gap has a linear configuration.

7. The apparatus according to claim 1 wherein the build gap has a circular configuration.

8. The apparatus according to claim 1 wherein the at least one energy source is supported in a printing block which is configured to move along a path above the build gap.

9. The apparatus according to claim 8 wherein the printing block is configured to move in a first direction and a second opposite direction and wherein the at least one energy source is configured to apply directed energy as the printing block moves in the first and second directions.

10. The apparatus according to claim 8 wherein the printing block defines a first delivery port of the powder delivery assembly adjacent to the at least one energy source.

11. The apparatus according to claim 10 wherein the printing block defines a second delivery port of the powder delivery assembly on an opposite side of the at least one energy source, the first delivery port configured to deliver powder when the printing block travels in a first direction and the second delivery port configured to deliver powder when the printing block travels in a second direction opposite the first direction.

12. The apparatus according to claim 10 wherein a containment assembly extends along a lower surface of the printing block, the containment assembly configured to seal against the base plate and/or the three-dimensional structure.

13. The apparatus according to claim 8 wherein the printing block defines a first vacuum nozzle proximate to the at least one energy source.

14. The apparatus according to claim 13 wherein the printing block defines a second vacuum nozzle on an opposite side of the at least one energy source, the first vacuum nozzle configured to vacuum the build gap when the printing block travels in a first direction and the second vacuum nozzle configured to vacuum the build gap when the printing block travels in a second direction opposite the first direction.

15. The apparatus according to claim 1 further comprising a roller assembly downstream from build gap, the roller assembly configured to compress the three-dimensional structure.

16. The apparatus according to claim 15 further comprising a heater positioned upstream of the roller assembly and configured to heat the three-dimensional structure prior to passing through the roller assembly.

17. The apparatus according to claim 1 further comprising an oven downstream from the build gap, the oven configured to heat treat the three-dimensional structure.

18. The apparatus according to claim 1 wherein after advancement over a second given distance, the advancement assembly no longer engages the base plate and only engages the three-dimensional structure.

19. A method of fabricating a three-dimensional structure using the apparatus according to claim 1, the method comprising:
 a) positioning the base plate along the lower surface of the build platform such that the edge of the base plate extends along and closes off the build gap defined in the build platform;
 b) retaining the base plate in position utilizing the advancement assembly;
 c) delivering powder to the build gap;
 d) moving the at least one directed energy source relative to the build platform to apply directed energy to the at least a portion of the build gap to form the layer of the three-dimensional structure;
 e) activating the advancement assembly such that the base plate and three-dimensional structure are moved downward a layer thickness relative to build platform; and
 f) repeating steps c-e until a complete three-dimensional structure is formed.

20. The method according to claim 19 wherein the advancement assembly includes at least one advancement member which is moveable toward and away from the build platform and at least one hold member in fixed relation to the build platform and wherein the advancement member and the hold member are each a selectively energized magnet.

21. The method according to claim 19 wherein the advancement assembly includes a pair of opposed rollers.

* * * * *